May 19, 1959        P. H. MEYER        2,886,846
MEAT TENDERIZER KNIFE ROLL ASSEMBLY
Filed March 28, 1957        2 Sheets—Sheet 1
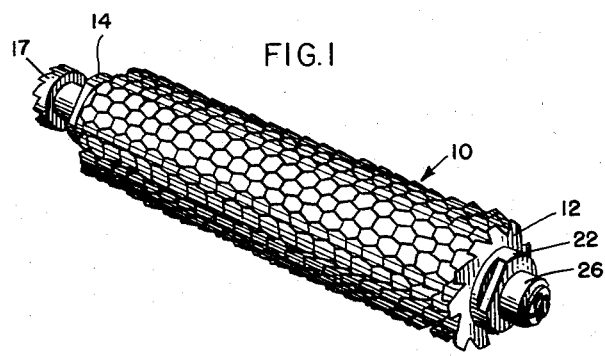
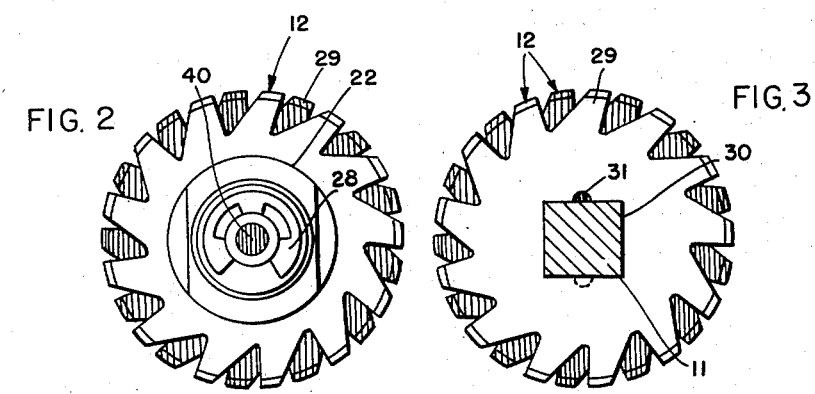
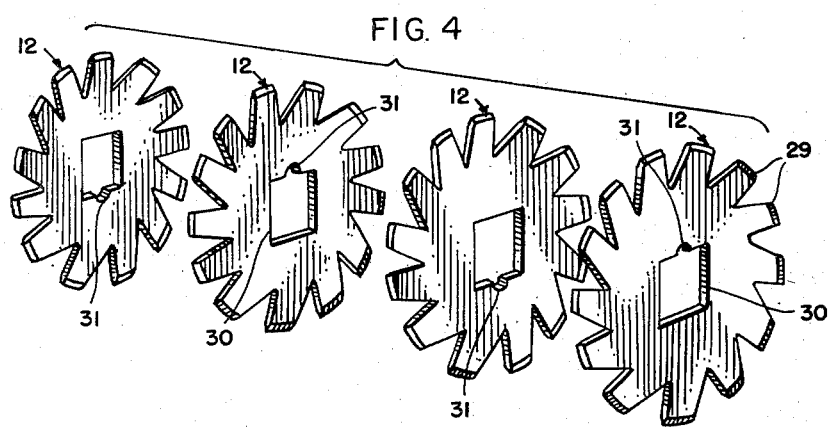
INVENTOR:
PAUL H. MEYER
BY
ATT'YS May 19, 1959 P. H. MEYER 2,886,846
MEAT TENDERIZER KNIFE ROLL ASSEMBLY
Filed March 28, 1957 2 Sheets-Sheet 2
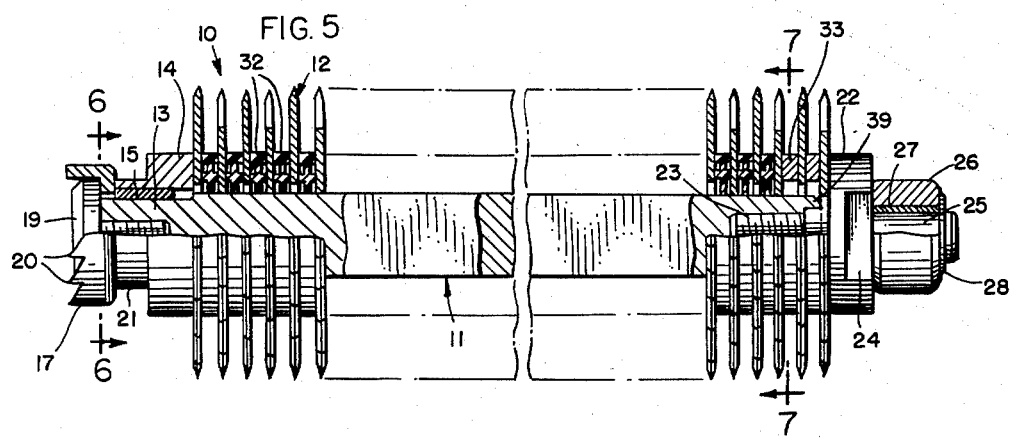
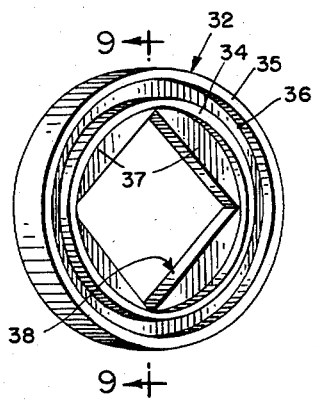
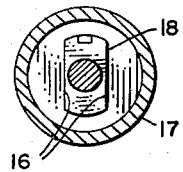
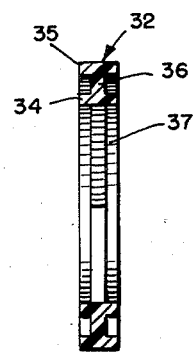
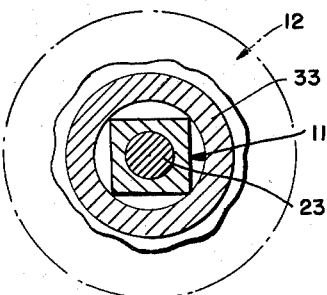
INVENTOR:
PAUL H. MEYER
BY
Mazall, Johnston, Cook & Root
ATT'YS

United States Patent Office 2,886,846
Patented May 19, 1959

2,886,846

MEAT TENDERIZER KNIFE ROLL ASSEMBLY

Paul H. Meyer, La Porte, Ind., assignor to U.S. Slicing Machine Company, Inc., La Porte, Ind., a corporation of Indiana Application March 28, 1957, Serial No. 649,197

13 Claims. (Cl. 17—26)

This invention relates in general to an improved knife roll assembly for use in meat tenderizing machines.

Meat tenderizing machines of today generally include knife rolls which are removable to facilitate the cleaning thereof. In such cases, each knife roll is mounted between parallel walls and must therefore be of a constant length.

Furthermore, a tenderizing machine usually employs a pair of knife rolls wherein each knife roll assembly includes a plurality of spaced knife blades, and wherein the knife blades of one knife roll are positioned in intermeshing relationship with the knife blades of the other roll so that the edges of the knife blades overlap. Accordingly, the spacing between the knife blades must be substantially uniform to provide proper intermeshing of the blades without causing the blades to contact one another, for if the blades should contact one another, it would render the machine inoperative. Thus, it is appreciated that the type of spacer utilized between the blades is very important in order to attain the proper overall length of the assembly and uniform spacing between the knives.

The present invention deals with a knife roll assembly wherein the blade and spacers may be easily assembled on the shaft and held together in a compressed relationship by retaining means at opposite ends of the shaft. Each spacer is made of nylon and is compressible so that the knife blades may be properly arranged on the shaft. Further, the shape and construction of the nylon spacers used to space the knife blades uniformly along the knife roll permits equal contraction or expansion between all knife blades as the roll is tightened or loosened. Accordingly, the spacers are compressed to obtain proper blade spacing and overall length of the knife roll assembly. Inasmuch as the spacers are compressible, they further serve to seal against the faces of the knife blades and prevent the ingress of dirt or other foreign elements to the shaft. Each knife blade is provided with an odd number of teeth equally spaced along a circumference and a centrally located polygonal opening sized to be received on the polygonal shaft. A mark is provided on each knife blade so that the adjacent knife blades may be arranged 180° from each other to thereby stagger the teeth of adjacent knives. This arrangement facilitates the assembling of the knife roll assemblies.

It is therefore an object of this invention to provide an improved knife roll assembly for use in meat tenderizing machines.

Another object of this invention is in the provision of a knife roll assembly wherein the assembly may be quickly and easily assembled thereby reducing the cost of manufacture.

Still another object of this invention resides in the provision of a spacer for spacing the knife blades along the length of a shaft of the knife roll assembly, wherein the shape and construction of the spacer effects uniform spacing of the knife blades along the assembly and permits equal contraction or expansion between all of the knives as the roll assembly is tightened or loosened.

A further object of this invention is to provide a nylon spacer for use in uniformly spacing knife blades along a knife roll assembly wherein the spacers are compressed to obtain the proper blade spacing and overall length of the assembly.

A still further object of this invention resides in the provision of a nylon spacer for uniformly spacing knife blades along a knife roll assembly, wherein the spacers coact with the opposite faces of the knife blades in order to seal the shaft from ingress of dirt or other foreign elements which would effect a deterioration on the shaft.

Still another object of this invention is to provide a knife roll assembly including a polygonal shaft and knife blades having an odd number of teeth equally spaced along a circumference and provided with a polygonal opening centrally located thereof, wherein the adjacent knife blades may be rotated 180° relative to each other in order to stagger the knife blades along the roll assembly.

Other objects, features, and advantages of the invention will be apparent from the following detailed disclosure, taken in conjunction with the accompanying sheets of drawings, wherein like reference numerals refer to like parts, in which:

Fig. 1 is a perspective view of a knife roll assembly embodying the invention;

Fig. 2 is an enlarged end view of the knife roll assembly in Fig. 1 looking from right to left;

Fig. 3 is an enlarged transverse sectional view taken through the knife assembly of Fig. 1 and illustrating the manner of arranging the knife blades on the shaft;

Fig. 4 is an enlarged perspective view of a plurality of knife blades in spaced apart relationship, illustrating the markings of the blades and the manner in which they would be arranged on the shaft in order to effect staggering of the teeth on the blades;

Fig. 5 is an enlarged broken elevational view of the knife roll assembly in accordance with the invention, illustrating some parts in section;

Fig. 6 is a transverse sectional view, taken substantially along line 6—6 of Fig. 5;

Fig. 7 is a transverse sectional view taken substantially along line 7—7 of Fig. 5;

Fig. 8 is a further enlarged perspective view of the nylon spacer utilized to uniformly space the disc knives along the shaft; and Fig. 9 is a transverse sectional view of the nylon spacer, taken substantially along line 9—9 of Fig. 8.

Referring now to the drawings, the knife roll assembly, generally indicated by the numeral 10, includes generally a shaft 11 having a plurality of stacked knife blades 12 spaced along the length thereof.

The shaft 11 is polygonal in shape and preferably square as shown for the most part thereof. At the left end, a cylindrical section 13 receives thereon a thrust collar or washer 14 which serves to provide an abutment for one end of the stack of blades. Key ways are provided for the cylindrical section 13 of the shaft and the collar 14 to receive a key 15 and prevent relative rotation between the collar and the shaft. As seen in Fig. 6, the very end of the cylindrical section 13 of the shaft is flatted at opposite sides as indicated at 16 to receive a clutch member 17 having a central opening to be snugly received so that the parts will corotate with each other. Finally, the collar and clutch member are held on the end of the shaft by the screw or bolt 19 having a slotted head.

The clutch member 17 is cup-shaped and provided with a plurality of teeth 20 which are adapted to engage another clutch member having similarly or complementary formed teeth and which is connected to a power source. Thus, the knife roll assembly 10 is driven from one end by the clutch member 17. It will be noted that the collar 14 is diametrically reduced at 21 so that a groove is formed between the clutch member 17 and the larger end of the collar to form a bearing surface which will rest in a notched plate, as more clearly set forth in the Henry L Byland and Paul H. Meyer copending application Serial No. 649,053, filed March 28, 1957.

At the other end of the shaft a thrust collar or washer 22 bears against the other end of the stack of blades in order to maintain them in mounted position on the shaft 11. This collar includes a threaded shank 23 within a tapped bore in the end of the shaft 11 and which may be tightened onto the shaft by a wrench or other tool which can grip opposing flatted sections 24 on the collar. Extending from the outer end of the collar is the diametrically reduced stub shaft 25 which carries or journals a bearing 26 having an oilite bushing 27. A retaining ring 28 coacts with a groove formed adjacent the end of the stub shaft 25 to be mounted on the shaft and maintain the bearing 26 thereon.

Each knife blade 12 is disc-shaped and includes a plurality of teeth 29 equally spaced along the circumference at the periphery of the blade. The teeth are canted in one direction and an odd number of teeth are provided on each blade, and as in this case, thirteen in number. Centrally located in each blade is an opening 30 of polygonal shape, and in this case square so that it may be received snugly on the square shaft 11, Fig. 3. Adjacent plates are arranged so that the teeth are staggered, as seen in Figs. 2 and 3 and in order to accomplish this arrangement adjacent blades are rotated 180° relative to each other. In order to facilitate assembly of the blades, a notch 31, or other equivalent marking, is made along one edge of the square opening 30 so that it may be readily determined how one blade may be rotated 180° to the other. It will be appreciated that all of the blades are identical, and that the square opening is arranged so that upon rotating an adjacent blade 180°, the teeth of the adjacent blades will be staggered as seen in Figs. 2 and 3. Consequently, the notch 31 will be placed on the same side of the opening in each plate when the blades are initially manufactured.

The knife blades 12 are spaced uniformly along the length of the shaft 11 by formed blade spacers, generally indicated by the numeral 32, Figs. 5, 8, and 9. The last few knife blades at the right hand end of the assembly are separated by solid metal blade spacers 33.

Each spacer 32 is compressible and of such shape and configuration as to uniformly space the knife blades along the length of the shaft, and whereby equal contraction or expansion between all knife blades on the roll is permitted during tightening or loosening thereof. These formed blade spacers are made of nylon, although they may be made of any other suitable or equivalent material and include inner and outer rings 34 and 35 interconnected by a radial web 36. Extending radially inward from the inner ring 34 are circumferentially spaced sections 37 shaped to define a polygonal opening 38 which is square in this case. Consequently, each section 37 is arcuate on the side which connects to the inner ring 34 and straight on the side which coacts with the other sections to form the square opening 38. It may be further noted in Fig. 9 that the inner and outer rings 34 and 35 have equal axial thicknesses and substantially equal radial thicknesses with the opposite axial ends being perfectly aligned. Also, the axial thickness of the web 36 and the sections 37 is less than the axial thicknesses of the rings, and the axial ends of the rings extend beyond the axial sides of the web 36 and section 37. When the nylon spacers are mounted on the shaft and compressed between adjacent blades, the inner and outer rings serve to seal against the opposite faces of the knife blades and prevent the ingress of foreign elements to the shaft 11. Further, inasmuch as the blades 12 and the spacers 32 have square openings for being received on the square shaft 11, relative rotation between the spacers, the blades and the shaft is prohibited.

The knife roll assembly 10 may be assembled by first arranging the thrust collar 14 and the key 15 on the cylindrical end 13 of the shaft 11. The clutch member 17 may then be arranged over the outer end of the shaft and into engagement with the flatted sides 16, and the screw 19 turned into the tapped hole in the end of the shaft to form the assembly as seen in Fig. 5. The knife blades 12 and the nylon spacers 32 are then arranged on the shaft in alternating fashion wherein adjacent knife blades are rotated 180° from each other. As seen in Fig. 4, the first knife blade may be arranged on the square shaft 11 with the notch 31 directed downwardly. After a spacer 32 is then arranged in abutting relation to the blade, a second knife blade will be arranged on the shaft with the notch 31 extending upwardly so that this knife blade is positively rotated 180° with respect to the first knife blade and that the teeth are then positively staggered along the roll. Similarly, after the mounting of another spacer 32 on the shaft, the next knife blade may be mounted with its notch extending downwardly as would the first knife blade and the succeeding knife blade may then be mounted with the notch extending upwardly as was the second knife blade. The spacers are compressed on the knife shaft 11, and the right hand end of the shaft, Fig. 5, is chamfered at 39 in order to aid in guiding the last few knives on the shaft.

Inasmuch as the nylon spacers may not set properly when compressed over the chamfered end of the shaft, one or more end metal spacers 33 are provided in the assembly. These metal spacers 33 are merely annular in form, Fig. 7, with the inner diameter fitting snugly over the square shaft 11. The stack of blades and spacers are then compressed on the shaft and the thrust collar 22 is tightened thereon in order to maintain the assembly in compressed relationship, wherein the knife blades are uniformly spaced along the length of the knife shaft 11, and the proper blade spacing and overall length is accomplished. The bearing 26 and the retaining ring or clip 28 may have been assembled on the stub shaft 25 of the thrust collar 22 before or after the thrust collar 22 is mounted on the shaft 11. The very last knife blade at the right hand end of the assembly, as seen in Fig. 5, may or may not have its teeth staggered with respect to the teeth of the next adjacent blade inasmuch as this blade actually sits on an annular shoulder formed on the thrust collar 22.

At the end of the knife roll assembly in the end of the stub shaft 25 of the collar 22, a colored identifying plug 40, Fig. 2, serves to identify the proper knife roll assembly for positioning in the proper bearing supports of a knife frame as more clearly set forth in the Henry L. Byland and Paul H. Meyer copending application, Serial No. 649,053, filed March 28, 1957.

It is now apparent that the specific structure of the knife blades, the retaining collars at the opposite ends, and the spacers is such as to facilitate assembly of the knife roll which obviously reduces manufacturing costs and to provide an improved and more efficient knife roll assembly.

It will be understood that modifications and variations

The invention is hereby claimed as follows:

1. A knife roll assembly for meat tenderizing machines comprising a shaft, a plurality of knife blades mounted on said shaft and spaced apart along the length thereof, a plurality of spacer members also mounted on said shaft, each located between adjacent knife blades, some of said spacers being compressible axially of said shaft, each compressible spacer including an outer annular section, an inner annular section concentric therewith, a radial web interconnecting said sections, and circumferentially spaced sections extending radially inward from said inner annular section defining a polygonal opening.

2. In a knife roll assembly for meat tenderizing machines including a polygonal shaft, a plurality of knife blade discs mounted on said shaft and spaced apart axially thereof, compressible spacers mounted on said shaft between adjacent knife blade discs, each spacer comprising inner and outer concentric rings interconnected by a radial web, and circumferentially spaced sections extending radially inward from said inner ring, each section having an arcuate side connected to said inner ring and an opposing straight side joining the opposite ends of said arcuate side, whereby the straight sides of said sections coact to define a polygonal opening in said spacer.

3. In a knife roll assembly for meat tenderizing machines including a polygonal shaft, a plurality of knife blade discs mounted on said shaft and spaced apart axially thereof, compressible spacers mounted on said shaft between adjacent knife blade discs, each spacer comprising inner and outer concentric rings interconnected by a radial web, and circumferentially spaced sections extending radially inward from said inner ring, each section having an arcuate side connected to said inner ring and an opposing straight side joining the opposite ends of said arcuate side, the axial width of said web and said sections being less than the axial width of said rings, whereby the straight sides of said sections coact to define a polygonal opening in said spacer.

4. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings interconnected by a radial web, and circumferentially spaced sections extending radially inward from said inner ring, each section having an arcuate side connected to said inner ring and an opposing straight side joining the opposite ends of said arcuate side, whereby the straight sides of said sections coact to define a polygonal opening in said spacer.

5. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening.

6. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening, the axial thickness of said rings being greater than the axial thickness of said web.

7. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening, the axial thickness of said rings being greater than the axial thickness of said web and said sections.

8. In a knife roll assembly for meat tenderizing machine including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening, the axial thickness of said rings being greater than the axial thickness of said web and said sections, the radial thickness of said web being greater than the radial thickness of either ring.

9. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening, the axial thickness of said rings being greater than the axial thickness of said web, the opposite axial edges of said rings being spaced axially away from the corresponding opposite axial edges of said web.

10. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening, the axial thickness of said rings being greater than the axial thickness of said web and said sections, the opposite axial edges of said rings being spaced axially away from the corresponding opposite axial edges of said web and said sections.

11. In a knife roll assembly for meat tenderizing machines including a polygonal shaft, a plurality of knife blade discs mounted on said shaft and spaced apart axially thereof, compressible nylon spacers mounted on said shaft between adjacent knife blade discs, each spacer comprising inner and outer concentric rings, a radial web interconnecting said rings, and circumferentially spaced sections extending radially inward from said inner ring and coacting with each other to define a polygonal opening, the axial thickness of said rings being greater than the axial thickness of said web and said sections, the radial thickness of said web being greater than the radial thickness of either ring.

12. A spacing member comprising inner and outer concentric rings, a radial web interconnecting said rings, and circumferentially spaced sections extending radially inward from said inner ring and coacting with each other to define a polygonal opening.

13. A spacing member comprising inner and outer concentric rings, a radial web interconnecting said rings, and circumferentially spaced sections extending radially inward from said inner ring and coacting with each other to define a polygonal opening, said spacing member being made of nylon.

References Cited in the file of this patent

UNITED STATES PATENTS

| | | |
|---|---|---|
| 608,160 | Snelling | July 26, 1898 |
| 1,506,719 | Thuau | Aug. 26, 1924 |
| 1,908,695 | Deutsch | May 16, 1933 |
| 1,990,967 | Wenzel | Feb. 12, 1935 |
| 2,076,139 | Doherty et al. | Apr. 6, 1937 |
| 2,561,867 | Jackson | July 24, 1951 |
| 2,665,958 | Waldherr | Jan. 12, 1954 |
| 2,704,859 | Klingens | Mar. 29, 1955 |
| 2,760,378 | Deventer | Aug. 28, 1956 |

FOREIGN PATENTS

| | | |
|---|---|---|
| 77,904 | Netherlands | Apr. 15, 1955 |

OTHER REFERENCES

Zimmerli: Machine Design, March 1954, pp. 153–159.